(12) United States Patent
Nakanishi

(10) Patent No.: US 11,827,139 B2
(45) Date of Patent: Nov. 28, 2023

(54) VEHICLE HEADLAMP

(71) Applicant: KOITO MANUFACTURING CO., LTD., Tokyo (JP)

(72) Inventor: Yoshiyuki Nakanishi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 34 days.

(21) Appl. No.: 17/772,894

(22) PCT Filed: Oct. 19, 2020

(86) PCT No.: PCT/JP2020/039281
§ 371 (c)(1),
(2) Date: Apr. 28, 2022

(87) PCT Pub. No.: WO2021/085220
PCT Pub. Date: May 6, 2021

(65) Prior Publication Data
US 2022/0340074 A1 Oct. 27, 2022

(30) Foreign Application Priority Data

Oct. 30, 2019 (JP) .................................. 2019-197512
Oct. 30, 2019 (JP) .................................. 2019-197513

(51) Int. Cl.
*B60Q 1/08* (2006.01)
*B60Q 1/18* (2006.01)
*F21S 41/32* (2018.01)

(52) U.S. Cl.
CPC ............... *B60Q 1/08* (2013.01); *B60Q 1/18* (2013.01); *F21S 41/32* (2018.01); *B60Q 2300/112* (2013.01)

(58) Field of Classification Search
CPC ........ F21S 41/148; F21S 41/25; F21S 41/255; F21S 41/32; F21S 41/321; F21S 41/663;
(Continued)

(56) References Cited

U.S. PATENT DOCUMENTS 6,309,094 B1 * 10/2001 Woerner .................. B60Q 1/12
362/465
2003/0039124 A1 * 2/2003 Tawa ....................... B60Q 1/10
362/531
(Continued)

FOREIGN PATENT DOCUMENTS

JP 2000-238576 A 9/2000
JP 2007-213879 A 8/2007
JP 2018-060734 A 4/2018

OTHER PUBLICATIONS

International Search Report dated Dec. 15, 2020 for WO 2021/085220 A1 (7 pages).

*Primary Examiner* — Andrew J Coughlin
*Assistant Examiner* — Steven Y Horikoshi
(74) *Attorney, Agent, or Firm* — Venjuris, P.C.

(57) ABSTRACT

A vehicle headlamp includes: a first light source unit that forms at least a high-beam light distribution pattern; a second light source unit that forms an additional light distribution pattern and irradiates light with a luminous intensity higher than that of the first light source unit; a posture switching mechanism that switches between a first posture in which an optical axis of the second light source unit is parallel to an optical axis of the first light source unit and a second posture in which the optical axis of the second light source unit is deviated in the horizontal direction by a predetermined angle from the optical axis of the first light source unit; and a controller that controls an ON/OFF state of the second light source unit and an operation state of the posture switching mechanism according to a vehicle speed acquired from a vehicle.

6 Claims, 10 Drawing Sheets

(58) Field of Classification Search
CPC .......... B60Q 1/068; B60Q 1/076; B60Q 1/08; B60Q 1/085; B60Q 1/12; B60Q 1/122; B60Q 1/124; B60Q 1/18; B60Q 2300/112; B60Q 2300/114
See application file for complete search history.

(56) References Cited

U.S. PATENT DOCUMENTS

| | | | | |
|---|---|---|---|---|
| 2003/0067762 | A1* | 4/2003 | Fukawa | B60Q 1/12 362/465 |
| 2006/0087856 | A1* | 4/2006 | Sugimoto | B60Q 1/18 362/466 |
| 2009/0073712 | A1* | 3/2009 | Yamamura | F21S 41/663 362/519 |
| 2018/0010758 | A1* | 1/2018 | Mochizuki | F21S 41/32 |
| 2019/0195453 | A1* | 6/2019 | Sakamoto | F21S 41/322 |
| 2020/0171999 | A1* | 6/2020 | Warner | B60Q 1/076 |

* cited by examiner

VEHICLE HEADLAMP

CROSS REFERENCE TO RELATED APPLICATIONS

This application is a national phase of PCT application No. PCT/JP2020/039281, filed on 19 Oct. 2020, which claims priority from Japanese patent application Nos. 2019-197512 and 2019-197513, filed on 30 Oct. 2019, all of which are incorporated herein by reference.

TECHNICAL FIELD

The present disclosure relates to a vehicle headlamp.

BACKGROUND

A vehicle headlamp capable of forming a high-beam light distribution pattern is known from Patent Document 1 or the like.

PRIOR ART DOCUMENT

Patent Document

Patent Document 1: Japanese Laid-Open Patent Publication No. 2018-060734

SUMMARY OF THE INVENTION

Problem to be Solved

There has been a demand in some cases to secure a wide view in the horizontal direction of a distance as well. As a result, in addition to a light source unit capable of forming a usual high-beam light distribution pattern, it may be considered to mount a light source unit capable of forming a further additional light distribution pattern. When it is intended to dispose the additional light source unit in the lamp mounted with the light source unit that forms a usual high-beam light distribution pattern, it is possible to secure a wide view in the horizontal direction of a distance by deviating the optical axis of the added light source unit from the front of the vehicle in the horizontal direction by adjusting the orientation of the additional light source unit. However, when the orientation of a plurality of light source units adjacent to each other is not uniform, it may feel that the appearance of the vehicle is unnatural.

Therefore, the present disclosure is to provide a vehicle headlamp capable of securing a wide view in the horizontal direction of a distance without deteriorating the appearance of the vehicle.

Means to Solve the Problem

A vehicle headlamp related to an aspect of the present disclosure includes: a first light source unit configured to form at least a high-beam light distribution pattern; a second light source unit configured to form an additional light distribution pattern that irradiates a distance that is equal to or farther than that of the high-beam light distribution pattern, and irradiate light with a luminous intensity higher than that of the first light source unit; a posture switching mechanism configured to switch between a first posture in which an optical axis of the second light source unit is parallel to an optical axis of the first light source unit and a second posture in which the optical axis of the second light source unit is deviated in a horizontal direction by a predetermined angle from the optical axis of the first light source unit; and a controller configured to control an ON/OFF state of the second light source unit and an operation state of the posture switching mechanism according to a vehicle speed acquired from a vehicle. The controller controls such that, when the vehicle speed is less than a first vehicle speed, the second light source unit is put in the first posture, and the second light source unit is turned OFF; when the vehicle speed becomes the first vehicle speed while the second light source unit is put in the first posture and turned OFF, the posture switching mechanism is operated to switch a posture of the second light source unit to the second posture; and when the vehicle speed becomes a second vehicle speed higher than the first vehicle speed while the second light source unit is put in the second posture and turned OFF, the second light source unit is turned ON.

A vehicle headlamp related to an aspect of the present disclosure includes: a first light source unit configured to form at least a high-beam light distribution pattern, and including a first light source and a first projection lens that emits light from the first light source to a front of a vehicle; and a second light source unit configured to form an additional light distribution pattern that irradiates a distance that is equal to or farther than the high-beam light distribution pattern, and irradiate light with a luminous intensity higher than that of the first light source unit, and including a second light source, a reflector that reflects light from the second light source, and a second projection lens that emits the light reflected by the reflector to the front of the vehicle. An optical axis of the second projection lens is parallel to an optical axis of the first projection lens, and an optical axis of the reflector is deviated in a left-right direction by a predetermined distance from the optical axis of the second projection lens.

The "optical axis of the reflector" is a line connecting a first focal point and a second focal point of the reflector. Further, the "optical axis of the reflector" may be specified based on the relationship between a position of a convex lens having well-known reference characteristics that is disposed in front of the reflector and a position of the light distribution pattern formed on a virtual vertical screen at the front by the light that is emitted from the light source, reflected by the reflector, and emitted from the convex lens. That is, while changing the position of the convex lens in the left-right direction, each position of the convex lens and the position of the light distribution pattern formed by the light emitted from the convex lens are compared with each other. Then, when the light distribution pattern is formed in the frontal direction (front direction) of the convex lens, the line connecting the center of the convex lens and the center of the light distribution pattern and passing through the reflector is the optical axis of the reflector.

The "optical axis of the projection lens" may be specified based on the relationship between a position of a light source serving as a reference that is disposed behind the projection lens and a position of the light distribution pattern formed on a virtual vertical screen at the front by the light that is emitted from the light source and emitted from the projection lens. That is, while changing the position of the light source in the left-right direction, each position of the light source and the position of the light distribution pattern formed by the light emitted from the light source and emitted from the projection lens are compared with each other. Then, when the light distribution pattern is formed in the frontal direction (front direction) of the light source, the line connecting the center of the light source and the center of the light distribution pattern and passing through the projection lens becomes the optical axis of the projection lens.

Effect of the Invention

According to the present disclosure, it is possible to provide a vehicle headlamp capable of securing a wide view in the horizontal direction at a distance without spoiling the appearance of the vehicle.

DETAILED DESCRIPTION TO EXECUTE THE INVENTION

Hereinafter, embodiments of the present disclosure will be described with reference to the drawings. Identical or corresponding components, members, and processes in each of the drawings will be denoted by the same symbols, and overlapping descriptions thereof will be appropriately omitted. Further, the embodiments are not intended to limit the present disclosure thereto, but are merely exemplary. All features described in the embodiments or combinations thereof may not be essential for the present disclosure.

Further, in the descriptions of the embodiment, the "left-right direction," the "upward-downward direction," and the "front-rear direction" may be appropriately stated for convenience of description. Those directions are relative directions set for the vehicle illustrated in FIGS. 1 and 8. Here, the "left-right direction" is a direction including the "left direction" and the "right direction." The "upward-downward direction" is a direction including the "upper direction" and the "downward direction." The "front-rear direction" is a direction including the "front direction" and the "rear direction." Although not illustrated in FIGS. 1 and 8, the upward-downward direction is a direction perpendicular to the left-right direction and the front-rear direction.

First Embodiment

Figure 1:
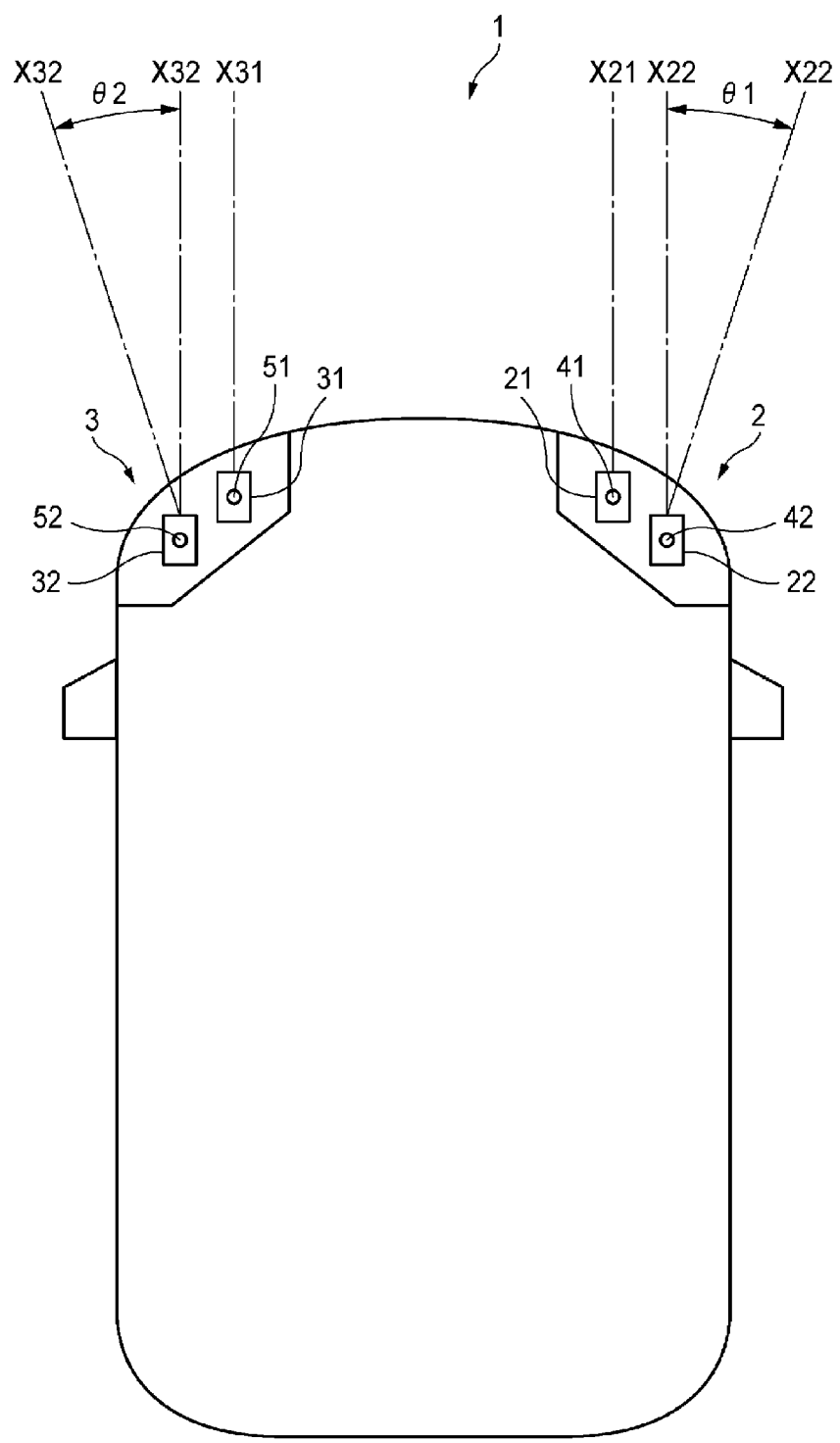
FIG. 1 is a top view of a vehicle on which a vehicle headlamp according to an embodiment of the present disclosure is mounted.

FIG. 1 is a top view of a vehicle 1 on which a right side headlamp 2 and a left side headlamp 3 (vehicle headlamp) according to a first embodiment of the present disclosure is mounted. As illustrated in FIG. 1, the right side headlamp 2 is mounted on the right side front portion of the vehicle 1, and the left side headlamp 3 is mounted on the left side front portion of the vehicle 1.

The right side headlamp 2 includes a first light source unit 21, and a second light source unit 22. The left side headlamp 3 includes a first light source unit 31, and a second light source unit 32. Since the left side headlamp 3 has the same configuration as the right side headlamp 2, the right side headlamp 2 will be described, and the description of the left side headlamp 3 will be omitted.

The first light source unit 21 is a light source unit capable of forming a high-beam light distribution pattern that illuminates a region at a distance. A first light source 41 is mounted on the first light source unit 21. The first light source 41, may be, for example, a white light emitting diode (LED), an incandescent lamp having a filament such as a halogen lamp or the like, or a high intensity discharge (HID) lamp such as a metal halide lamp or the like.

The first light source unit 21 is capable of forming a low-beam light distribution pattern and a high-beam light distribution pattern. For example, by using a shade mechanism or the like, the first light source unit 21 may be configured to switch between the low-beam light distribution pattern and the high-beam light distribution pattern. In addition to the low-beam light distribution pattern that irradiates below a cut line, the region above the cut line is irradiated with light, thereby forming the high-beam light distribution pattern. Since the first light source unit 21 is a so-called parabolic lamp unit and may adopt a well-known configuration, detailed description thereof will be omitted.

The second light source unit 22 is a light source unit capable of illuminating a region at a distance similarly to the first light source unit 21. The second light source unit 22 is capable of forming an additional light distribution pattern that irradiates light to a region at a distance that is equal to or farther than that of the high-beam light distribution pattern formed by the first light source unit 21.

In the embodiment, the region of the high-beam light distribution pattern formed by the first light source unit 21 above the low-beam light distribution pattern becomes a region irradiated with the additional light distribution pattern formed by the second light source unit 22. A second light source 42 is mounted on the second light source unit 22. For example, a laser diode (LD) is used as the second light source 42. The luminance of the second light source 42 is higher than the luminance of the first light source 41.

The second light source unit 22 is configured such that the mounting posture may be switched between two postures in the headlamp 2. The second light source unit 22 is configured to switch between a first posture in which an optical axis X22 thereof is parallel to an optical axis X21 of the first light source unit 21 and a second posture in which the optical axis X22 is deviated in the horizontally outward direction by a predetermined angle θ1 from the optical axis X21 of the first light source unit 21.

The second light source unit 32 of the left side headlamp 3 is configured to switch between a first posture in which an optical axis X32 thereof is parallel to an optical axis X31 of the first light source unit 31 and a second posture in which the optical axis X32 is deviated in the horizontally outward direction by a predetermined angle θ2 from the optical axis X31 of the first light source unit 31.

The predetermined angles θ1 and θ2 are, for example, −5 degree to to 5 degree. The angles θ1 and θ2 may be the same as or different from each other. For example, in the second posture of the second light source unit 22 of the right side headlamp 2, the optical axis X22 may be deviated by 3 degree in the outward direction with respect to the optical axis X21, and in the second posture of the second light source unit 32 of the left side headlamp 3, the optical axis X32 may be deviated by 2 degree in the inward direction with respect to the optical axis X31.

Figure 2:
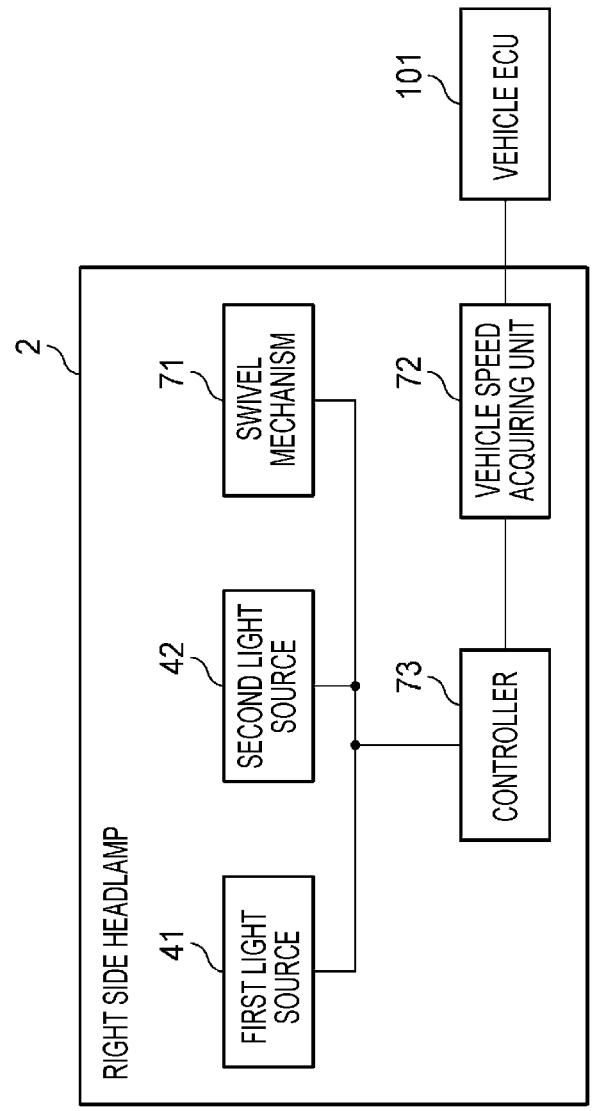
FIG. 2 is a block diagram of a right side headlamp.

FIG. 2 is a block diagram of the right side headlamp 2. As illustrated in FIG. 2, the right side headlamp 2 includes a swivel mechanism 71 (example of a posture switching mechanism), a vehicle speed acquiring unit 72, and a controller 73, in addition to the first light source 41 and the second light source 42.

The swivel mechanism 71 mechanically rotates the second light source unit 22 so as to change the orientation of the optical axis of the second light source unit 22 in the left-right direction. The swivel mechanism 71 is configured to switch the posture of the second light source unit 22 between the first posture and the second posture.

The vehicle speed acquiring unit 72 is configured to acquire the driving speed of the vehicle 1. The vehicle speed acquiring unit 72 is connected to a vehicle electronic control unit (ECU) 101 mounted on the vehicle 1. For example, the vehicle ECU 101 is configured to send vehicle speed information of the vehicle 1 acquired from a speed sensor to the vehicle speed acquiring unit 72. The vehicle speed acquiring unit 72 sends the vehicle speed information received from the vehicle ECU 101 to the controller 73.

The controller 73 controls the operation of each part of the right side headlamp 2. For example, the controller 73 controls the drive of the swivel mechanism 71, an ON/OFF of the first light source 41, and an ON/OFF of the second light source 42, based on the vehicle speed information of the vehicle 1 received from the vehicle speed acquiring unit 72.

Figure 3:
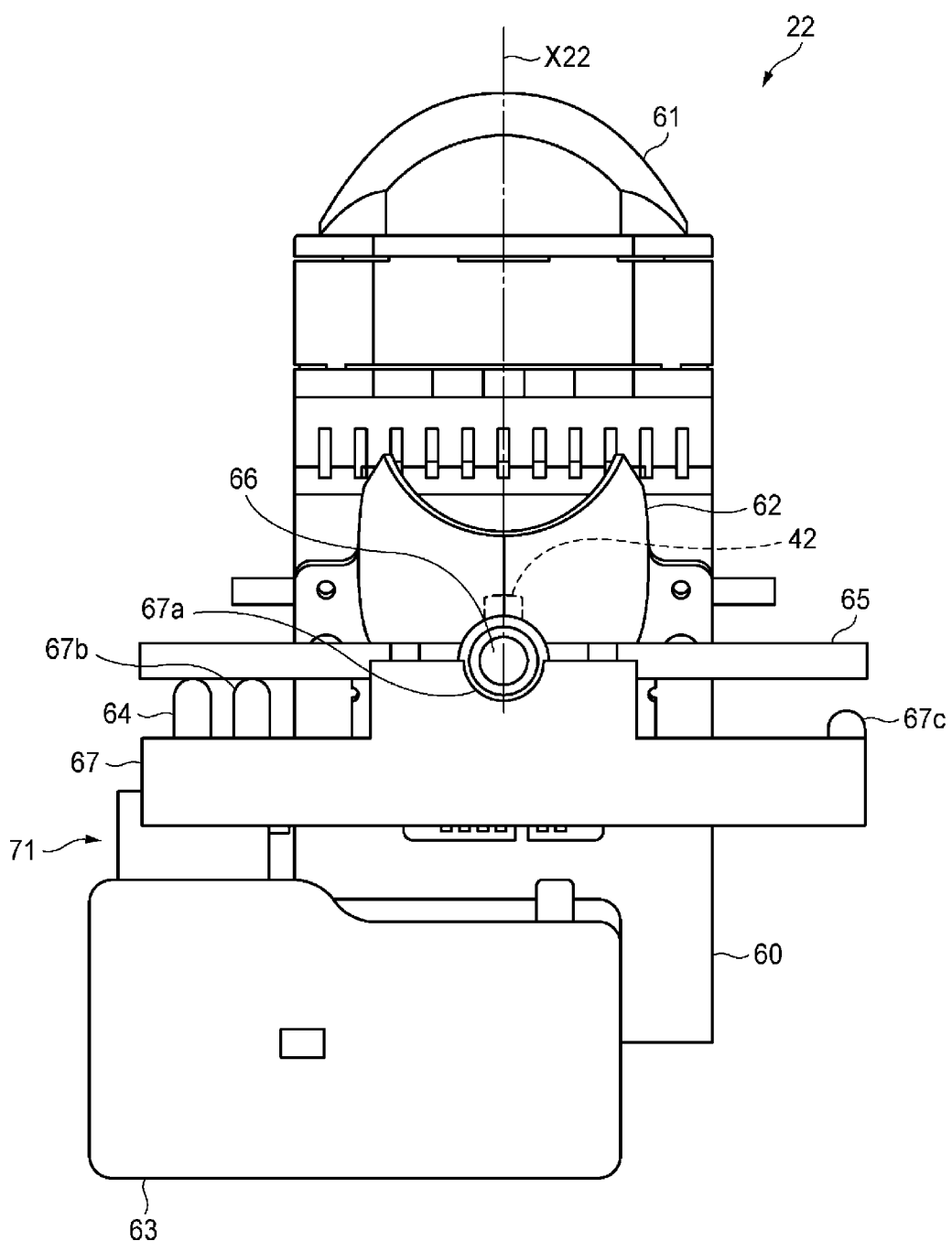
FIG. 3 is a view illustrating a second light source unit in a first posture.

FIG. 3 is a view illustrating the second light source unit 22 in the first posture. As illustrated in FIG. 3, the second light source unit 22 includes the second light source 42, a base 60, a projection lens 61, a reflector 62, and the swivel mechanism 71. The swivel mechanism 71 includes an actuator 63, an abutting portion 64, a link portion 65, a swing shaft portion 66, and a bracket 67.

The second light source 42, the projection lens 61, the reflector 62, and the link portion 65 are attached to the base 60. The actuator 63, the abutting portion 64, and the bracket 67 are fixed to a body of the right side headlamp 2 (not illustrated). The base 60 is rotatable with respect to a swing axis extending in the upward-downward direction with respect to the body of the right side headlamp 2.

The second light source 42 is attached to the base 60. The reflector 62 is attached to the base 60 so as to face the second light source 42. The projection lens 61 is attached to the front portion of the base 60. The reflector 62 has a spheroidal surface. The second light source 42 is positioned in the vicinity of a rear focal point of the reflector 62, and the vicinity of a rear focal point of the projection lens 61 is positioned at a front focal point of the reflector 62. Light emitted from the second light source 42 is reflected by the reflector 62, and is emitted to the front of the vehicle 1 along the optical axis X22 of the second light source unit 22 through the projection lens 61.

The link portion 65 is fixed to the base 60. The link portion 65 is a long member extending in the left-right direction. The swing shaft portion 66 is provided in the intermediate portion of the link portion 65 in the left-right direction. The swing shaft portion 66 protrudes upward from the link portion 65. The swing shaft portion 66 is supported by a swing bearing 67a provided in the intermediate portion of the bracket 67 in the left-right direction. The swing shaft portion 66 is supported by the swing bearing 67a so as to be rotatable around the swing axis extending in the upward-downward direction.

A force is applied to the link portion 65 to be rotated in the counterclockwise direction by a coil spring (not illustrated). A left side end portion of the link portion 65 abuts on a first stopper 67b provided in the left side portion of the bracket 67 so as to protrude forward. A right side end portion of the link portion 65 is separated from a second stopper 67c provided in the right side portion of the bracket 67 so as to protrude forward.

The actuator 63 is fixed to the body of the right side headlamp 2 together with the bracket 67. The actuator 63 is configured to move the abutting portion 64 in the front-rear direction (upward-downward direction in FIG. 3) of the second light source unit 22, based on the control signal from the controller 73.

Figure 4:
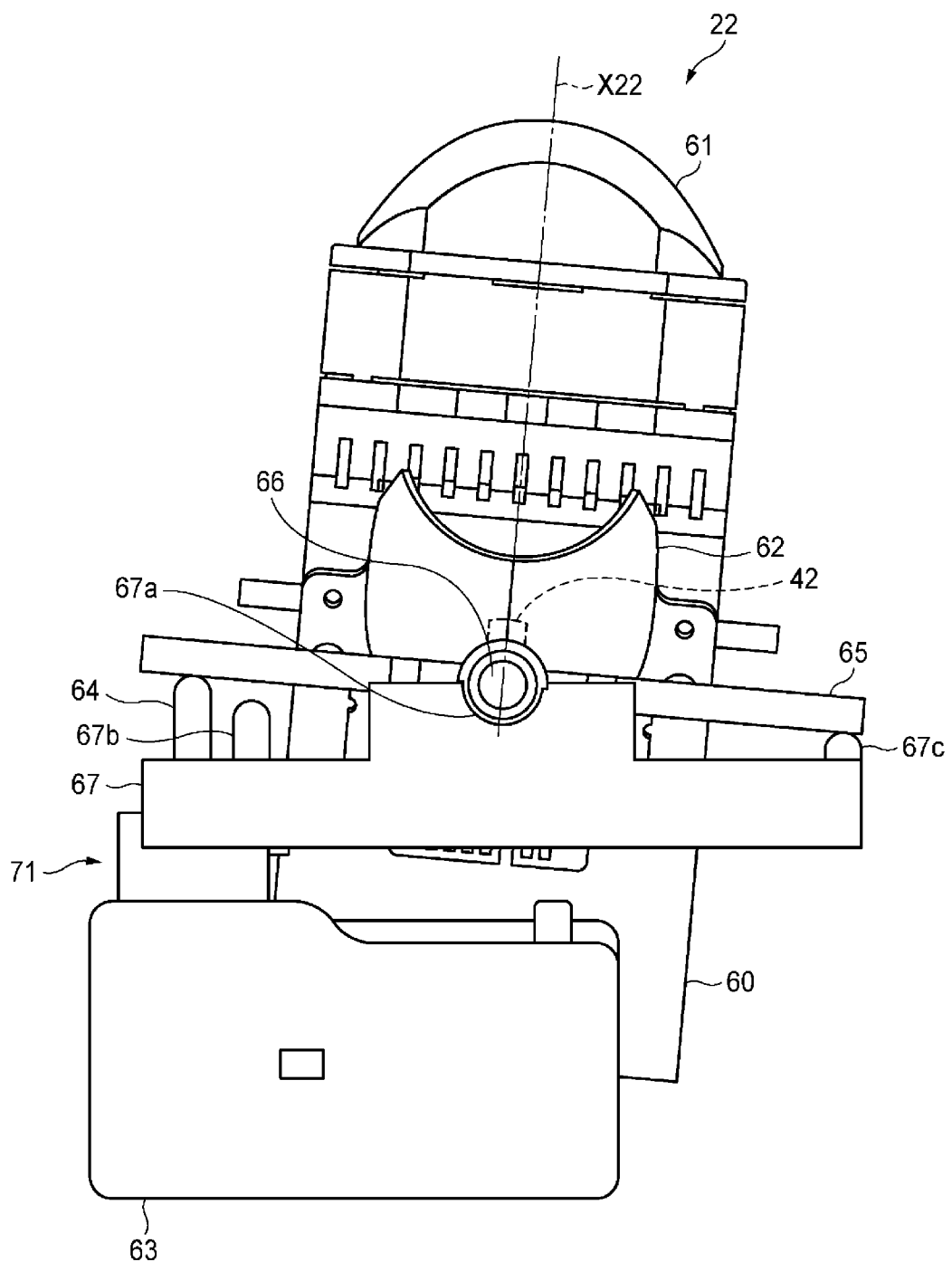
FIG. 4 is a view illustrating the second light source unit in a second posture.

Subsequently, the posture switching of the second light source unit 22 will be described with reference to FIGS. 3 and 4. As described above, FIG. 3 is a view illustrating the second light source unit 22 in the first posture. FIG. 4 is a view illustrating the second light source unit 22 in the second posture.

As illustrated in FIG. 3, when the second light source unit 22 is in the first posture, the actuator 63 pulls the abutting portion 64 most rearward. Further, the force in the counterclockwise direction acts on the link portion 65 by the coil spring provided in the swing shaft portion 66. As a result, the left side portion of the link portion 65 abuts on the first stopper 67b, and the first posture is maintained. In the first posture, the optical axis X22 of the second light source unit 22 is set to be parallel to the optical axis X21 of the first light source unit 21.

From the state of FIG. 3, when the actuator 63 is driven to extend the abutting portion 64 most forward, the second light source unit 22 becomes the second posture illustrated in FIG. 4. In FIG. 4, the abutting portion 64 protruded by the actuator 63 overcomes the force of the coil spring so that the link portion 65 is rotated until the right side portion of the link portion 65 abuts on the second stopper 67c. Since the link portion 65 is fixed to the base 60, the base 60 is rotated in the clockwise direction with respect to the actuator 63 or the bracket 67. Since the projection lens 61 and the reflector 62 are fixed to the base 60, the optical axis X22 of the second light source unit 22 is inclined by the predetermined angle θ1 with respect to the optical axis X21 of the first light source unit 21. When the actuator 63 is driven in this manner, the second light source unit 22 is maintained in the second posture.

Figure 5:
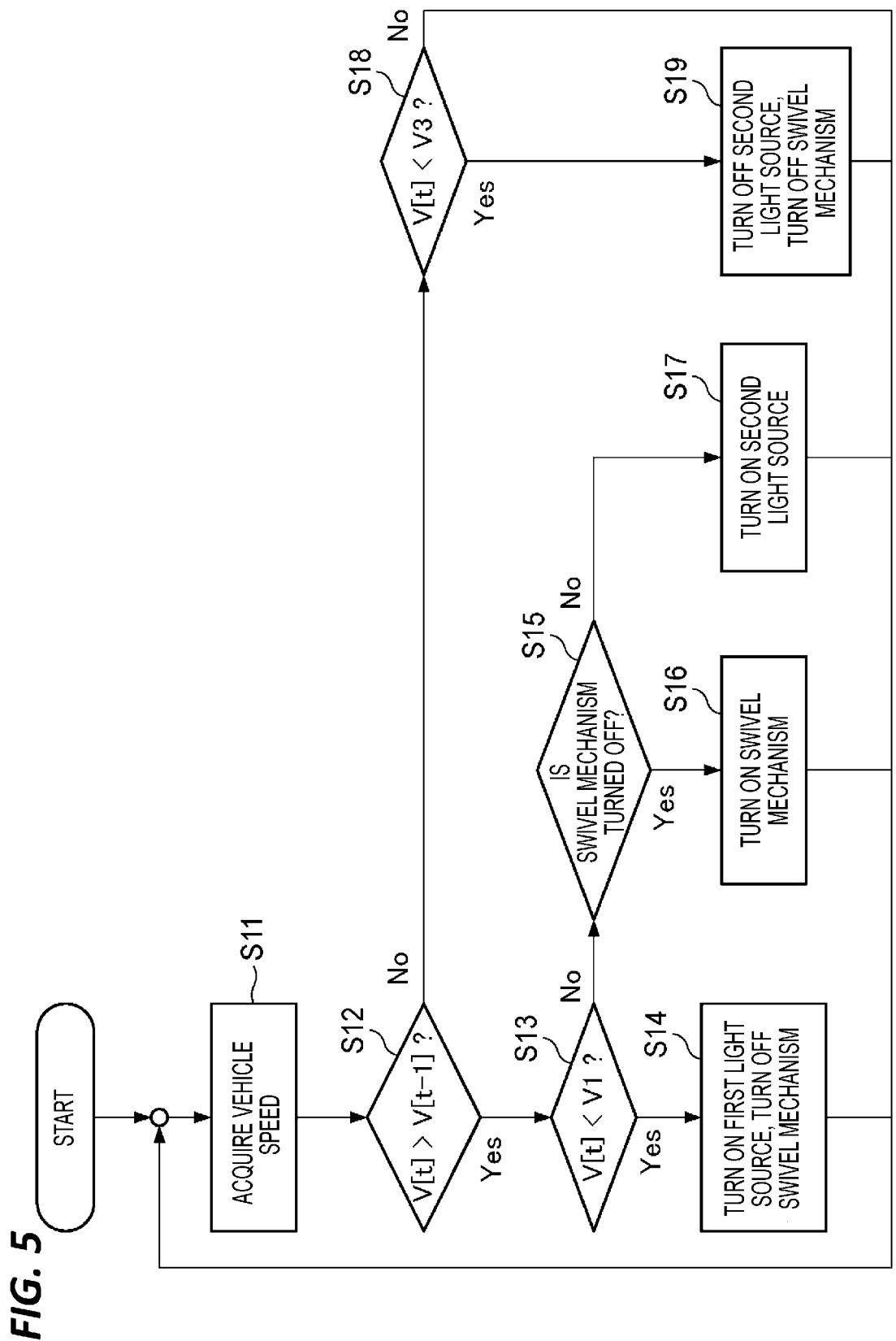
FIG. 5 is a flowchart illustrating an operation of a right side headlamp 2.

Subsequently, an operation of the right side headlamp 2 and the left side headlamp 3 will be described with reference to FIG. 5. FIG. 5 is a flowchart illustrating the operation of the right side headlamp 2 and the left side headlamp 3.

First, it is assumed that an ON/OFF button that turns on the headlamps 2 and 3 of the vehicle 1 is operated to the ON state, and the headlamps 2 and 3 are turned on with a high-beam.

The vehicle speed information of the vehicle 1 is acquired by the vehicle ECT 101, and the acquired vehicle speed information is sent to the vehicle speed acquiring unit 72. The controller 73 acquires the vehicle speed information of the vehicle 1 from the vehicle speed acquiring unit 72 (step S11).

The controller 73 determines whether the vehicle 1 is accelerating or decelerating based on the acquired vehicle speed information (step S12). For example, the controller 73 determines whether the vehicle 1 is accelerating or decelerating based on a vehicle speed V(t−1) acquired at the previous time and a vehicle speed V(t) acquired at this time.

When it is determined that the vehicle 1 is accelerating in step S12 (Yes in step S12), the controller 73 determines whether the current vehicle speed V(t) of the vehicle 1 is less than a first vehicle speed V1 (e.g., 60 km/h) (step S13).

When it is determined that the current vehicle speed V(t) is less than the first vehicle speed V1 in step S13 (Yes in step S13), the controller 73 turns on the first light sources 41 and 51 of the first light source units 21 and 31, maintains the swivel mechanism 71 that switches the posture of the second light source units 22 and 32 in a non-operated (OFF) state (step S14), and returns to step S11. Since the swivel mechanism 71 is not operated, the second light source units 22 and 32 remain in the first posture in which the optical axes X22 and X32 thereof are parallel to the optical axes X21 and X31 of the first light source units 21 and 31. In this stage, the second light sources 42 and 52 of the second light source units 22 and 32 are turned off.

Meanwhile, when it is determined that the current vehicle speed V(t) is equal to or higher than the first vehicle speed V1 in step S13 (No in step S13), the controller 73 determines whether the swivel mechanism 71 is in the non-operated state (step S15).

When it is determined that the swivel mechanism 71 is in the non-operated state in step S15 (Yes in step S15), the controller 73 operates (turns ON) the swivel mechanism 71 (step S16), and returns to step S11. The swivel mechanism 71 is operated, and thus, the second light source units 22 and 32 are switched to the second posture in which the optical axes X22 and X32 thereof are deviated by the angles θ1 and θ2 in the horizontally outward direction from the optical axes X21 and X31 of the first light source units 21 and 31. In this stage, the second light sources 42 and 52 of the second light source units 22 and 32 are turned off.

Meanwhile, when it is determined that the swivel mechanism 71 is in the operated state in step S15 (No in step S15), the controller 73 turns on the second light sources 42 and 52 (step S17), and returns to step S11. The case where it is determined that the swivel mechanism 71 is in the operated state in step S15 is a case where the vehicle speed V(t) of the vehicle 1 becomes a second vehicle speed V2 higher than the first vehicle speed V1 while the second light source units 22 and 32 are already switched to the second posture and the second light sources 42 and 52 are turned off. Therefore, while the second light source units 22 and 32 are in the second posture, the second light sources 42 and 52 of the second light source units 22 and 32 are turned on.

As described above, according to the right side headlamp 2 and the left side headlamp 3 (vehicle headlamp) according to the embodiment, when the vehicle speed V(t) is less than the first vehicle speed V1, the first light sources 41 and 51 of the first light source units 21 and 31 are turned on, the second light sources 42 and 52 of the second light source units 22 and 32 are turned off, and the second light source units 22 and 32 are in the first posture.

When the vehicle speed is high, it is desired to secure a wide view in the distant horizontal direction, but when the vehicle speed is low, it is less necessary to secure a wide view than the case where the vehicle speed is high. As a result, when the vehicle speed V(t) is less than the first vehicle speed V1, the second light sources 42 and 52 of the second light source units 22 and 32 are turned off. Further, when the vehicle speed V(t) is low, it is easy for a person near the vehicle 1 to observe the driving vehicle 1. At this time, if the optical axes X22 and X32 of the second light source units 22 and 32 are deviated from the optical axes X21 and X31 of the first light source units 21 and 31, the person who sees the right side headlamp 2 and the left side headlamp 3 feels a sense of incompatibility, and spoils the appearance of the vehicle 1.

Therefore, in the right side headlamp 2 and the left side headlamp 3 of the embodiment, when the vehicle speed V(t) is less than the first vehicle speed V1, the second light source units 22 and 32 are in the first posture. Since the optical axes X22 and X32 are not deviated from the optical axes X21 and X31 of the first light source units 21 and 31, the appearance of the vehicle 1 is not spoiled. Further, although the second light sources 42 and 52 are turned off when the vehicle speed is low, the first light sources 41 and 51 are turned on, and thus, a view at a distance is secured.

Meanwhile, when the vehicle 1 is driving at a high speed, it is difficult for a person near the vehicle to confirm the optical axis of the light source unit. That is, when the vehicle 1 is driving at a high speed, it does not matter even if the optical axes of the light source units are deviated. Further, when the vehicle 1 is driving at a high speed, a wide view in the distant horizontal direction is often required. Therefore, according to the vehicle headlamp of the embodiment, when the vehicle speed V(t) reaches the second vehicle speed V2 higher than the first vehicle speed V1 while the second light source units 22 and 32 are in the second posture and the second light sources 42 and 52 are turned off, the second light sources 42 and 52 are turned on. As a result, it is possible to irradiate a wide range when a wide view in the distant horizontal direction is required, and the appearance of the vehicle 1 may not be spoiled.

Further, according to the right side headlamp 2 and the left side headlamp 3, when the vehicle speed V(t) reaches the first vehicle speed V1 while the second light source units 22 and 32 are in the first posture and the second light sources 42 and 52 are turned off, the second light sources 42 and 52 are switched to the second posture. At this time, the second light sources 42 and 52 remain turned off. Further, when the vehicle speed V(t) reaches the second vehicle speed V2, the second light sources 42 and 52 of the second light source units 22 and 32 are turned on. Since the second light source units 22 and 32 are already switched to the second posture before the second light sources 42 and 52 are turned on, it is possible to immediately irradiate light to a distant wide range.

In this manner, according to the right side headlamp 2 and the left side headlamp 3 of the embodiment, it is possible to secure a wide view in the distant horizontal direction without spoiling the appearance of the vehicle 1.

When it is determined that the vehicle 1 is not accelerating in step S12 (No in step S12), the controller 73 may determine whether the current vehicle speed V(t) of the vehicle 1 is less than a third vehicle speed V3 (e.g., 50 km/h) that is equal to or less than the first vehicle speed V1 (step S18).

When it is determined that the current vehicle speed V(t) is not less than the third vehicle speed V3 in step S18 (No in step S18), the controller 73 returns to step S11 as it is.

Meanwhile, when it is determined that the current vehicle speed V(t) is less than the third vehicle speed V3 in step S18 (Yes in step S18), the controller 73 turns off the second light sources 42 and 52 of the second light source units 22 and 32, sets the swivel mechanism 71 to the non-operated (OFF) state (step S19), and returns to step S11. The swivel mechanism 71 becomes the OFF state, and thus, the second light source units 22 and 32 are switched to the first posture in which the optical axes X22 and X32 thereof are parallel to the optical axes X21 and X31 of the first light source units 21 and 31.

In this manner, according to the right side headlamp 2 and the left side headlamp 3 of the embodiment, when the vehicle speed becomes less than the third vehicle speed V3 that is equal to or less than the first vehicle speed V1 while the second light source units 22 and 32 are in the second posture and the second light sources 42 and 52 are turned on, the second light sources 42 and 52 are turned off and the second light source units 22 and 32 are switched to the first posture. Since the third vehicle speed V3 is equal to or less than the first vehicle speed V1, it is easy to maintain the state where the second light source units 22 and 32 are turned on in the second posture. Therefore, it is easy to suppress the situation where the second light source units 22 and 32 are frequently turned on and off.

Figure 6:
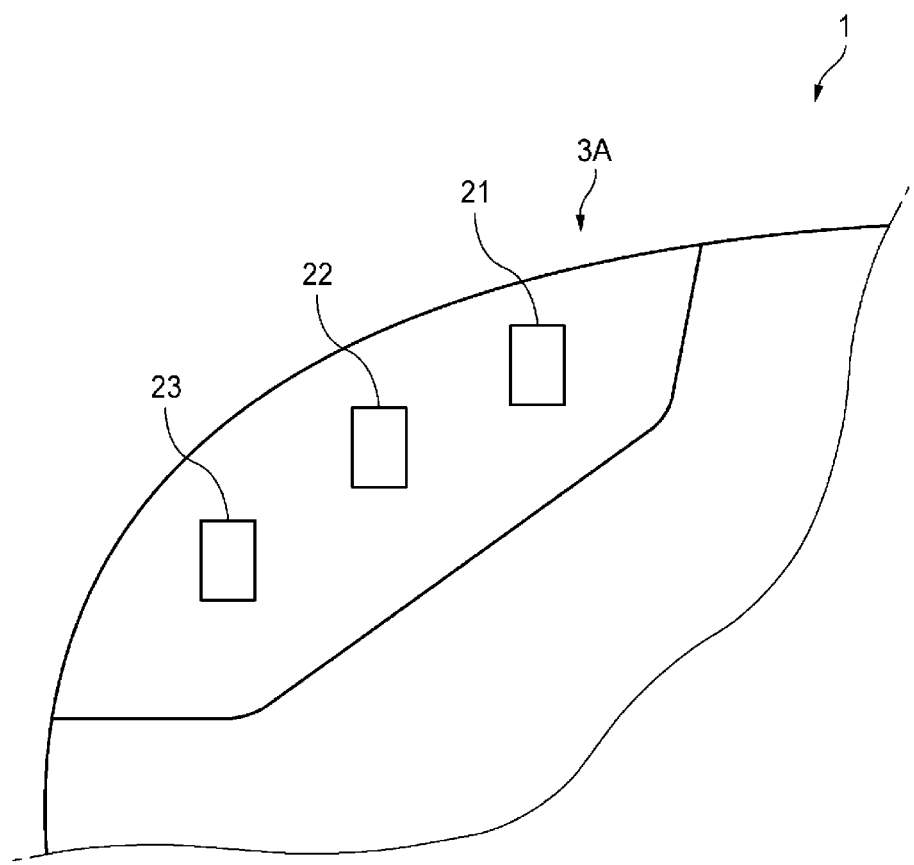
FIG. 6 is a top view illustrating a left side front portion of a vehicle on which a vehicle headlamp according to a modification of the present disclosure is mounted.

FIG. 6 is a top view illustrating the left side front portion of the vehicle 1 on which a left side headlamp 3A (vehicle headlamp) according to a modification of the present disclosure is mounted. The left side headlamp 3A of the modification includes a third light source unit 23, in addition to the first light source unit 21 and the second light source unit 22.

Since the first light source unit 21 and the second light source unit 22 have the same configuration as that of the above-described embodiment, the description thereof will be omitted. The first light source unit 21 is capable of switching and forming a low-beam light distribution pattern and a high-beam light distribution pattern. The second light source unit 22 is capable of forming an additional light distribution pattern formed by irradiating light in a direction deviated from the front of the lamp by a predetermined angle in the left-right direction.

The third light source unit 23 is configured by disposing a light source unit capable of originally forming only a high-beam light distribution pattern, in the lamp chamber of the left side headlamp 3A with the optical axis thereof slightly inclined upward. Since the third light source unit 23 has a well-known structure in the related art, detailed description thereof will be omitted. The light distribution pattern formed by the third light source unit 23 is called an auxiliary light distribution pattern.

Figure 7A:
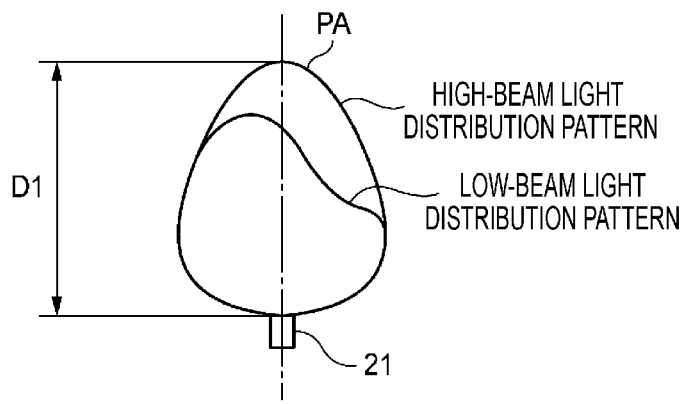
FIG. 7A is a view of a ground illuminated by light emitted by a light source viewed from above, and illustrates a high-beam light distribution pattern formed by a first light source unit.
Figure 7B:
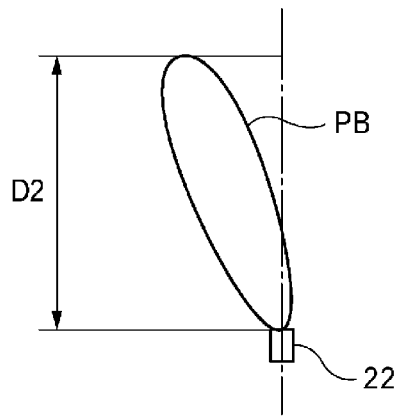
FIG. 7B is a view of a ground illuminated by light emitted by a light source viewed from above, and illustrates an additional light distribution pattern formed by the second light source unit.
Figure 7C:
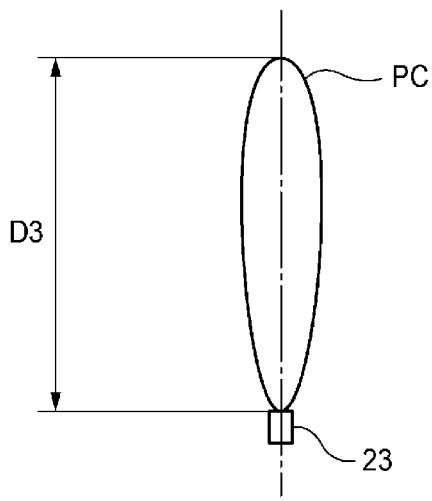
FIG. 7C is a view of a ground illuminated by light emitted by a light source viewed from above, and illustrates an irradiation range of an auxiliary light distribution pattern formed by a third light source unit.

FIGS. 7A to 7C are views of a ground illuminated by light emitted by each of the light source units 21 to 23 viewed from above. FIG. 7A illustrates an irradiation range of a high-beam light distribution pattern PA formed by the first light source unit 21, FIG. 7B illustrates an irradiation range of an additional light distribution pattern PB formed by the second light source unit 22, and FIG. 7C illustrates an irradiation range of an auxiliary light distribution pattern PC formed by the third light source unit 23, respectively.

As illustrated in FIGS. 7A to 7C, the high-beam light distribution pattern PA formed by the first light source unit 21 is a light distribution pattern that is widened most in the left-right direction. The additional light distribution pattern PB formed by the second light source unit 22 is a light distribution pattern that extends in a direction deviated by the angle θ2 from the front of the lamp. The auxiliary light distribution pattern PC formed by the third light source unit 23 is a light distribution pattern that irradiates light to the front of the lamp. A maximum reachable distance D3 of the auxiliary light distribution pattern PC is larger than a maximum reachable distance D1 of the high-beam light distribution pattern PA. Further, in the illustrated example, the maximum reachable distance D3 of the auxiliary light distribution pattern PC is set to be larger than a maximum reachable distance D2 of the additional light distribution pattern PB. The maximum reachable distance D3 of the auxiliary light distribution pattern PC may be set to, for example, 1 to 5 times the maximum reachable distance D1 of the high-beam light distribution pattern PA.

According to the vehicle headlamp according to the modification, when the vehicle speed is low, view in the left-right direction in the vicinity of the vehicle and view at a distance are secured by the high-beam light distribution pattern PA formed by the first light source unit 21. When the vehicle speed is high, view also in the left-right direction at a distance is secured by the additional light distribution pattern PB formed by the second light source unit 22. Further, view also in front of the vehicle at a farther distance may be secured by turning on the third light source unit 23. The third light source unit 23 may be configured such that the occupant manually switches the ON/OFF, or may be turned on/off in conjunction with the ON/OFF of the second light source unit 22 described above. Similarly to the above-described embodiment, also in the vehicle headlamp according to the modification, the appearance may be good when the vehicle speed is low, and view at a distance may be secured when the vehicle speed is high.

The present disclosure is not limited to the above-described embodiment, but may be appropriately modified and improved. In addition, the material, shape, size, numerical value, form, number, arrangement place or the like of each component in the above-described embodiment are not limited, but arbitrary as long as the present disclosure may be achieved.

In the embodiment and the modification thereof, the first light source unit 21 that forms a high-beam light distribution pattern may be a single unit or a plurality of units. That is, it is sufficient for the first light source unit 21 to form the high-beam light distribution pattern, and a high-beam light distribution pattern may be formed by a single unit, or a high-beam light distribution pattern may be formed by bringing each of light distributions of a plurality of units to be adjacent each other, or synthesizing the light distributions to be partially overlapped with each other. In this case, the plurality of units that form the high-beam light distribution pattern is the first light source unit.

For example, in the above-described embodiment, the swivel mechanism 71 including the actuator 63, the link portion 65, the stoppers 67b and 67c, and the coil spring has been described, but the configuration of the swivel mechanism 71 is not limited to this example. For example, it may be configured such that the abutting portion 64 of the actuator 63 and the link portion 65 are connected with each other via an appropriate link mechanism so as to switch the first posture and the second posture by the ON/OFF of the actuator 63 and maintain the posture, without using the coil spring.

Second Embodiment

A vehicle headlamp capable of forming a high-beam light distribution pattern is known from Patent Document 1 or the like.

By the way, in some cases, there is a demand to secure a wide view in the left-right direction at a distance. As a result, in addition to a light source unit capable of forming a usual high-beam light distribution pattern, it may be considered mounting a light source unit capable of forming a further additional light distribution pattern.

A wide view in the left-right direction at a distance may be secured by inclining the optical axis of the added light source unit by a predetermined angle in the left-right direction from the front of the vehicle. However, when the orientation of the added light source unit is not oriented to the same direction as that of the usual light source, it may feel that the appearance of the vehicle is unnatural.

Therefore, a second embodiment of the present disclosure provides a vehicle headlamp capable of securing a wide view in the left-right direction at a distance without spoiling the appearance of the vehicle.

A vehicle headlamp according to the second embodiment will be described below with reference to FIG. 8.

Figure 8:
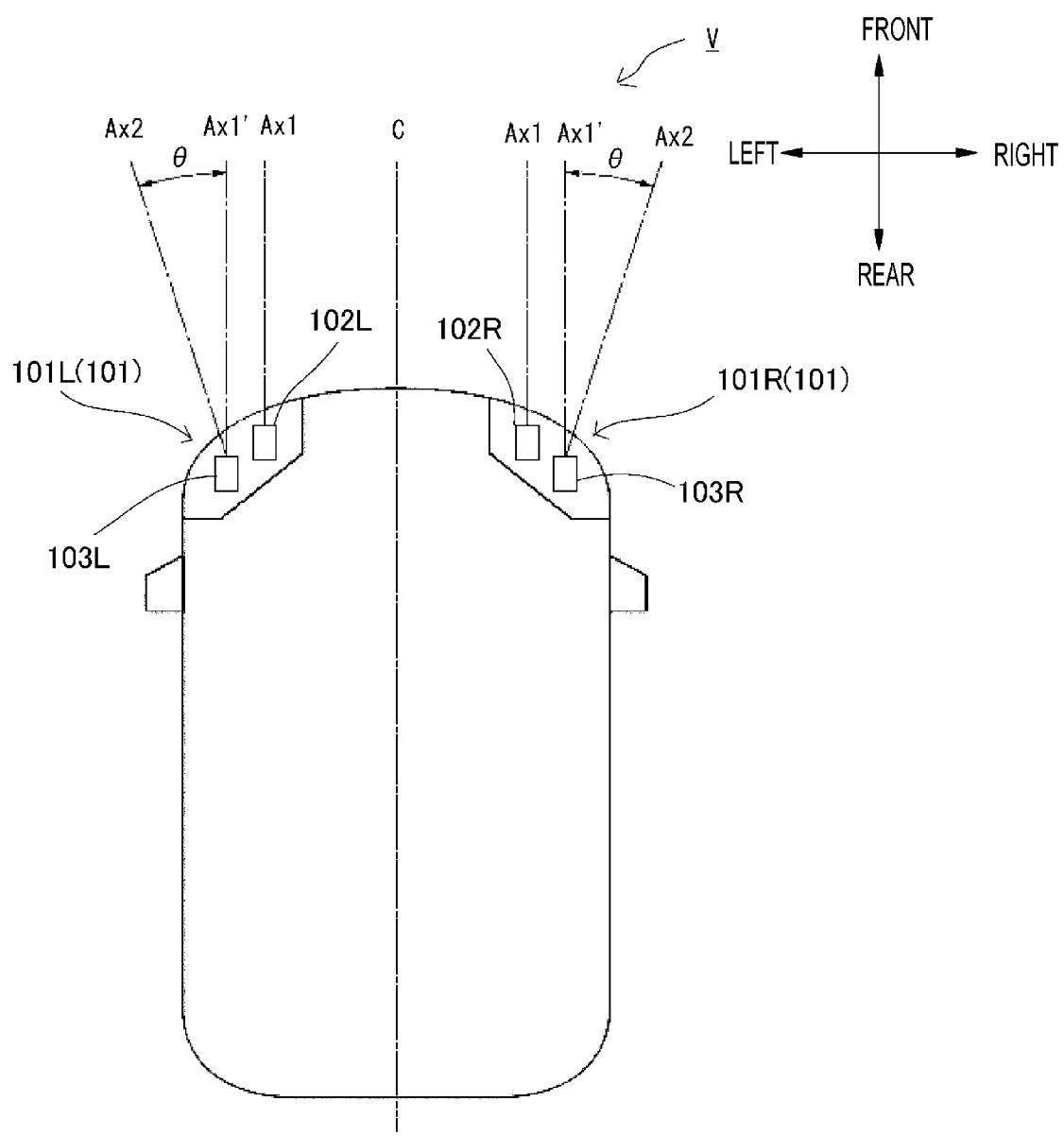
FIG. 8 is a view illustrating a vehicle on which a vehicle headlamp according to an embodiment is mounted.

FIG. 8 is a view illustrating a vehicle V on which the vehicle headlamp according to the embodiment is mounted. As illustrated in FIG. 8, vehicle headlamps 101 (101L and 101R) are provided in both sides of the front portion of the vehicle V.

The vehicle headlamp 101 (hereinafter, referred to as a "right side headlamp 101R") provided in the right side of the front portion of the vehicle V includes a first light source unit 102R and a second light source unit 103R. The first light source unit 102R and the second light source unit 103R are disposed inside a lamp chamber formed by a housing opened to the front side of the vehicle and a front lens that covers the opening of the housing.

The vehicle headlamp 101 (hereinafter, referred to as a "left side headlamp 101L") provided in the left side of the front portion of the vehicle V includes a first light source unit 102L and a second light source unit 103L. The first light source unit 102L and the second light source unit 103L are disposed inside a lamp chamber formed by a housing opened to the front side of the vehicle and a front lens that covers the opening of the housing.

The first light source unit 102R and the second light source unit 103R of the right side headlamp 101R and the first light source unit 102L and the second light source unit 103L of the left side headlamp 101L are symmetrically disposed with respect to a vehicle center line C. In the example, the second light source units 103L and 103R are disposed outside the vehicle from the first light source units 102L and 102R.

The basic configuration (the first light source unit 102L and the second light source unit 103L) of the left side headlamp 101L is equal to the basic configuration (the first light source unit 102R and the second light source unit 103R) of the right side headlamp 101R. In the following, the right side headlamp 101R will be described, and the descriptions on the configuration of the left side headlamp 101L overlapping with the right side headlamp 101R will be omitted.

In the right side headlamp 101R, the first light source unit 102R is a light source unit capable of forming a high-beam light distribution pattern that illuminates a region at a distance. The first light source unit 102R is disposed such that an optical axis Ax1 thereof is parallel to the front-rear direction of the vehicle. The optical axis Ax1 of the first light source unit 102R is a straight line that connects the reference point (e.g., the center of the light source) of the first light source unit 102R and a point on a virtual vertical screen in front of the vehicle where the luminous intensity of the first light source unit 102R is maximum.

The second light source unit 103R is a light source unit capable of illuminating a region at a distance similarly to the first light source unit 102R. The second light source unit 103R is capable of forming an additional light distribution pattern that irradiates a distance that is equal to or farther than that of the high-beam light distribution pattern formed by the first light source unit 102R. The second light source unit 103R is configured to irradiate light having a luminous intensity higher than that of the first light source unit 102R. The second light source unit 103R is configured such that an optical axis Ax2 thereof is inclined by a predetermined angle θ in the left-right direction with respect to the optical axis Ax1 of the first light source unit 102R. The predetermined angle θ may be 3° to 5°.

The optical axis Ax2 of the second light source unit 103R is a straight line that connects the reference point (e.g., the center of the light source or the center of the projection lens) of the second light source unit 103R and a point on a virtual vertical screen in front of the vehicle where the luminous intensity of the second light source unit 103R is maximum.

When "the optical axis Ax2 of the second light source unit 103R is inclined by a predetermined angle in the left-right direction with respect to the optical axis Ax1 of the first light source unit 102R," the straight line that connects the reference point of the second light source unit 103R and the point on the virtual vertical screen in front of the vehicle where the luminous intensity of the second light source unit 103R is maximum is in a state of being inclined by a predetermined angle in the left-right direction with respect to the straight line that connects the reference point of the first light source unit 102R and the point on the virtual vertical screen in front of the vehicle where the luminous intensity of the first light source unit 102R is maximum. In other words, the distance in the left-right direction between the point where the luminous intensity of the first light source unit 102R is maximum and the point where the luminous intensity of the second light source unit 103R is maximum on the virtual vertical screen in a first position in front of the vehicle is smaller than the distance in the left-right direction between the point where the luminous intensity of the first light source unit 102R is maximum and the point where the luminous intensity of the second light source unit 103R is maximum on the virtual vertical screen in a second position that is further forward than the first position.

Figure 9:
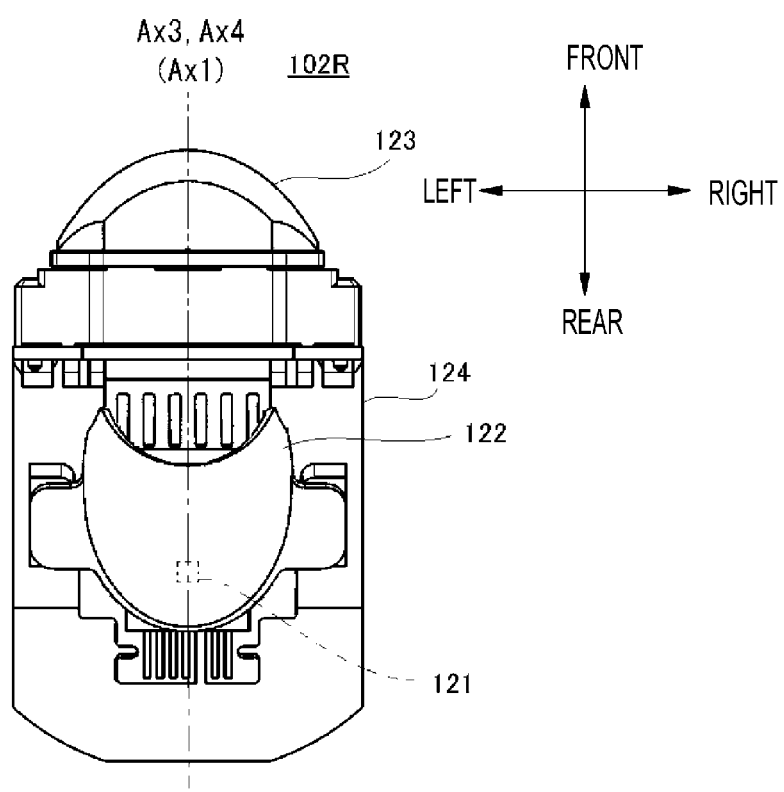
FIG. 9 is a plan view illustrating a configuration of a first light source unit.

FIG. 9 is a plan view illustrating a configuration of the first light source unit 102R.

The first light source unit 102R includes a first light source 121, a first reflector 122, and a first projection lens 123. The first light source 121 is constituted by, for example, one or more light emitting elements such as a light emitting diode (LED) or a laser diode (LD). For example, the first light source 121 is mounted on an upper surface of a support member 124 in a posture in which the light emitting surface faces upward.

For example, the first reflector 122 is attached so as to cover the upper surface of the support member 123, the rear side of the first light source 121, and the upper side of the first light source 121. For example, the first reflector 122 has a reflecting surface constituted by a substantially spheroidal surface, and the first light source 121 is disposed at or near a first focal point of the spheroidal surface.

For example, the first projection lens 123 is a plano-convex lens having a front surface of a convex curved surface and a rear surface of a flat surface. A rear side focal point of the first projection lens 123 is at or near a second focal point of the spheroidal surface of the first reflector 122. An optical axis Ax3 of the first reflector 122 and an optical axis Ax4 of the first projection lens 123 coincide with the optical axis of the first light source unit 102R.

Light emitted from the first light source 121 is reflected by the first reflector 122. The light reflected by the first reflector 122 is emitted to the front of the vehicle by the first projection lens 123.

The first light source unit 102R is not limited to the structure in FIG. 9. The first light source unit 102R may take another structure as long as the light from the first light source 121 is emitted to the front of the vehicle by the first projection lens 123. For example, the first light source unit 102R may have a structure in which the light emitting surface of the first light source 121 faces the first projection lens 123 without including the first reflector 122.

Figure 10:
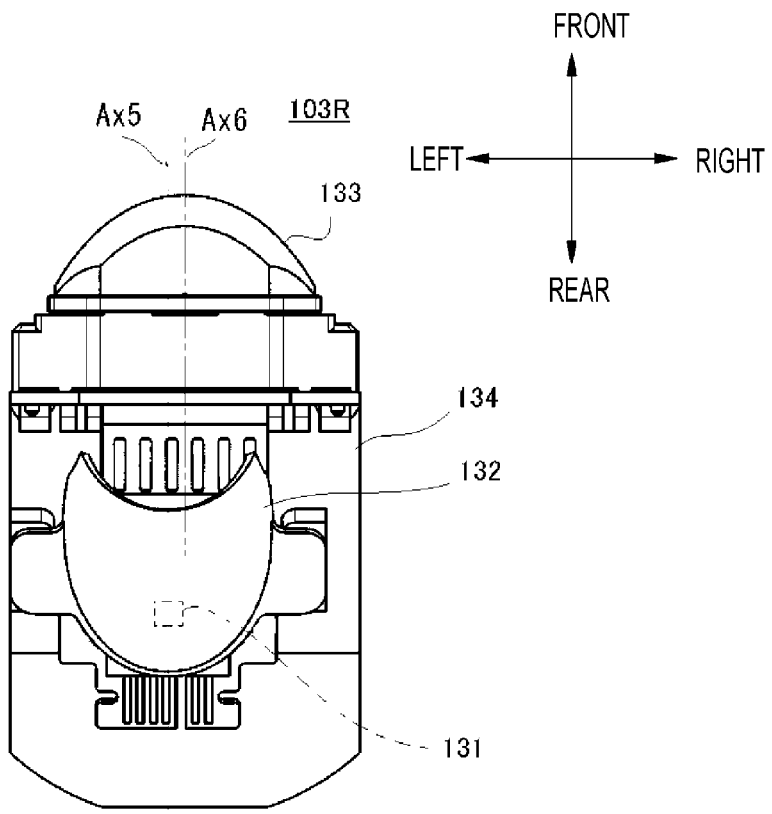
FIG. 10 is a plan view illustrating a configuration of a second light source unit.

FIG. 10 is a plan view illustrating a configuration of the second light source unit 103R.

The second light source unit 103R includes a second light source 131, a second reflector 132, and a second projection lens 133. For example, the second light source 131 is a light source having luminance higher than that of the first light source 121, and is constituted by one or more light emitting elements such as a light emitting diode (LED) or a laser diode (LD). For example, the second light source 131 is mounted on an upper surface of a support member 134 in a posture in which the light emitting surface faces upward.

For example, the second reflector 132 is attached so as to cover the upper surface of the support member 134, the rear side of the first light source 131, and the upper side of the first light source 131. For example, the second reflector 132 has a reflecting surface constituted by a substantially spheroidal surface, and the second light source 131 is disposed at or near a first focal point of the spheroidal surface.

For example, the second projection lens 133 is a plano-convex lens having a front surface of a convex curved surface and a rear surface of a flat surface. The second projection lens 133 is disposed such that an optical axis Ax6 of the second projection lens 133 is deviated by a predetermined distance in the left-right direction from an optical axis Ax5 of the second reflector 132. For example, a rear side focal point of the second projection lens 133 is at or near a second focal point of the spheroidal surface of the second reflector 132 in the front-rear direction, and is deviated in the left-right direction with respect to the second focal point of the spheroidal surface of the second reflector. Therefore, the optical axis Ax2 of the second light source unit 103R is inclined by the predetermined angle θ in the left-right direction from the optical axis Ax1 of the first light source unit 102R.

When "the optical axis Ax5 of the second reflector 132 and the optical axis Ax6 of the second projection lens 133 are deviated from each other," on the virtual vertical screen in front of the vehicle, the position of the point where the luminous intensity of the second light source unit 103R is maximum when there is no second projection lens 133 is deviated from the position of the point where the luminous intensity of the second light source unit 103R is maximum when there is the second projection lens 133.

Further, the second projection lens 133 is disposed such that the optical axis Ax6 thereof is parallel to the optical axis Ax4 of the first projection lens 123. Therefore, the right side headlamp 101R may be visually recognized as if the first projection lens 123 and the second projection lens 133 are facing the same direction when viewed from the front of the vehicle.

Light emitted from the second light source 131 is reflected by the second reflector 132. The light reflected by the second reflector 132 is emitted to the front of the vehicle by the second projection lens 133. The light emitted from the second projection lens 133 is emitted in the direction inclined by a predetermined angle in the left-right direction with respect to the light emitted from the first projection lens 123. That is, the light emitted by the second light source unit 103R is emitted in the direction inclined by the predetermined angle θ in the left-right direction from the light emitted by the first light source unit 102R.

In FIG. 10, the optical axis Ax6 of the second projection lens 133 is deviated to the right side with respect to the optical axis Ax5 of the second reflector 132. Therefore, the light emitted from the second projection lens 133 is emitted in the direction inclined by a predetermined angle to the right side of the vehicle with respect to the light emitted from the first projection lens 123. That is, the optical axis Ax2 of the second light source unit 103R is inclined by a predetermined angle in the right direction with respect to the optical axis Ax1 of the first light source unit 102R.

Meanwhile, when the optical axis Ax6 of the second projection lens 133 is deviated to the left side with respect to the optical axis Ax5 of the second reflector 132, the light emitted from the second projection lens 133 is emitted in the direction inclined by a predetermined angle to the left side of the vehicle with respect to the light emitted from the first projection lens 123. That is, the optical axis Ax2 of the second light source unit 103R is inclined by a predetermined angle in the left direction with respect to the optical axis Ax1 of the first light source unit 102R.

The inclination angle of the optical axis Ax2 of the second light source unit 103R with respect to the optical axis Ax1 of the first light source unit 102R is varied according to the distance in the left-right direction between the optical axis Ax5 of the second reflector 132 and the optical axis Ax6 of the second projection lens 133. The relationship between the inclination angle of the optical axis Ax2 and the distance between the optical axes Ax5 and Ax6 is determined according to the design such as the magnification of the projection lens. Therefore, the optical axis of the second light source unit 103R may be inclined to a desired angle by adjusting the distance between the optical axes Ax5 and Ax6 according to the design of the projection lens. For example, the optical axis of the second light source unit 103R may be inclined to a desired angle by adjusting the distance in the left-right direction between the rear side focal point of the second projection lens 133 and the second focal point of the spheroidal surface of the second reflector 132.

Figure 11:
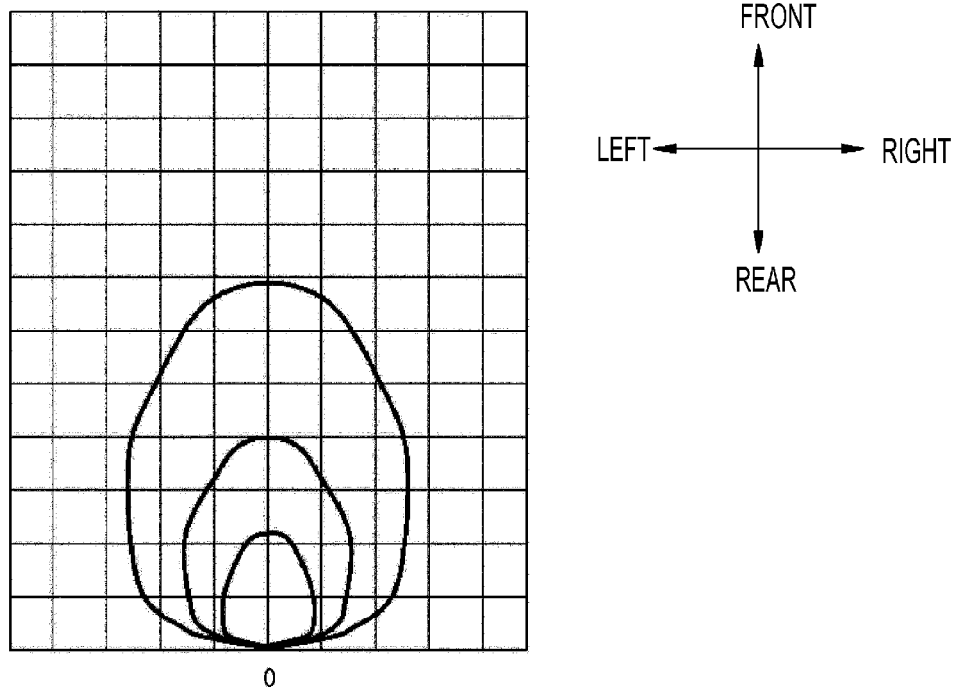
FIG. 11 is a view illustrating an illuminance contour line of light irradiated by a first light source unit of left and right headlamps.
Figure 12:
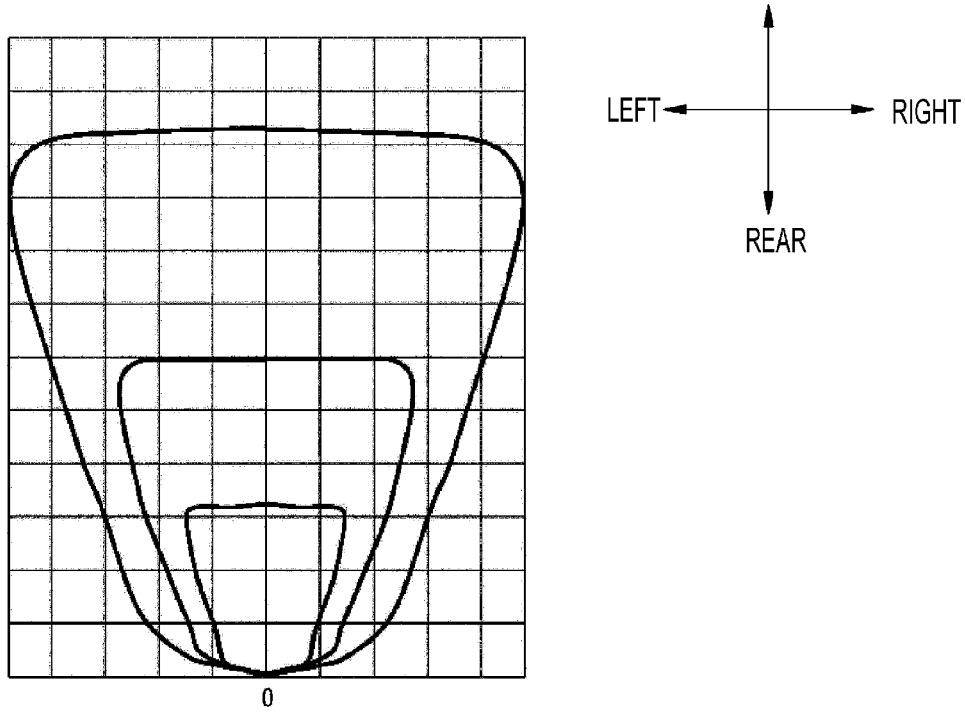
FIG. 12 is a view illustrating an illuminance contour line of light irradiated by the first light source unit and a second light source unit of the left and right headlamps.

FIG. 11 illustrates an illuminance contour line of light irradiated by the first light source units 102L and 102R of the left and right headlamps 101L and 101R. FIG. 12 illustrates an illuminance contour line of light irradiated by the first light source units 102L and 102R and the second light source units 103L and 103R of the left and right headlamps 101L and 101R. The contour lines in FIGS. 11 to 12 illustrate illuminance contour lines of light irradiated to the road surface in front of the vehicle.

As illustrated in FIGS. 11 and 12, it is possible to irradiate a wider range in the left-right direction at a distance farther than the range irradiated by the light from only the first light source units 102L and 102R, by adding the light from the second light source units 103L and 103R.

As described above, in the vehicle headlamp 101 according to the embodiment, the optical axis Ax6 of the second projection lens 133 is parallel to the optical axis Ax4 of the first projection lens 123. Therefore, the second projection lens is oriented in the same direction as the first projection lens, and thus, the appearance of the vehicle is not spoiled. Further, the optical axis Ax5 of the second reflector 132 is deviated by a predetermined distance in the left-right direction with respect to the optical axis Ax6 of the second projection lens 133. Therefore, the optical axis Ax2 of the second light source unit 103R is inclined by a predetermined angle in the left-right direction from the optical axis Ax1 of the first light source unit 102R. Therefore, it is possible to secure a wide view in the left-right direction at a distance without spoiling the appearance of the vehicle.

As illustrated in FIG. 10, in the embodiment, the second reflector 132 and the second projection lens 133 are disposed such that the optical axis Ax5 of the second reflector 132 is parallel to the optical axis Ax6 of the second projection lens 133. Therefore, an optical design is facilitated.

Although the embodiments of the present disclosure have been described above, of course, the technical scope of the present disclosure should not be construed as being limited by the description of the embodiments. It will be appreciated by those skilled in the art that the embodiments are merely examples and various modifications can be made on the embodiments within the scope of the present disclosure described in the claims. The technical scope of the present disclosure should be determined based on the scope of the disclosure described in the claims and the equivalent scope thereof.

In the embodiment, the second light source units 103L and 103R are configured such that the optical axis Ax2 thereof is inclined toward the outside of the vehicle with respect to the optical axis Ax1 of the first light source units 102L and 102R, but the present disclosure is not limited thereto. For example, the second light source units 103L and 103R may be configured such that the optical axis Ax2 thereof is inclined toward the inside of the vehicle with respect to the optical axis Ax1 of the first light source units 102L and 102R. In this case, the light emitted by the second light source unit 103R may be emitted to the left direction from the light emitted by the first light source unit 102L, and the light emitted by the second light source unit 103L may be emitted to the right direction from the light emitted by the first light source unit 102R.

In the embodiment, the second light source units 103L and 103R are disposed outside the vehicle from the first light source units 102L and 102R, but the present disclosure is not limited thereto. For example, the second light source units 103L and 103R may be disposed inside the vehicle from the first light source units 102L and 102R.

In the embodiment, the first light source units 102L and 102R form a high-beam light distribution pattern, but the present disclosure is not limited thereto. For example, the first light source units 102L and 102R may be configured to form a low-beam light distribution pattern in addition to the high-beam light distribution pattern.

In the embodiment, the vehicle headlamp 101 includes the first light source units 102L and 102R, and the second light source units 103L and 103R, but the present disclosure is not limited thereto. The vehicle headlamp 101 may further include a light source unit that forms an auxiliary light distribution pattern that irradiates light to a region in front of the vehicle farther than the high-beam light distribution pattern at the time of forming the high-beam light distribution pattern of the first light source units 102L and 102R.

Further, the vehicle headlamp 101 may include other lamps such as a clearance lamp or a low-beam lamp.

The vehicle headlamp 101 of the embodiment may include a swivel mechanism that turns the light distribution directions of the first light source units 102L and 102R and the second light source units 103L and 103R in the left-right direction, and may be configured to move the optical axes of the light source units in the left-right direction. In this case, it is possible to irradiate a high-beam light distribution pattern to a wide range at a distance in a predetermined direction, by moving the first light source units 102L and 102R and the second light source units 103L and 103R in the left-right direction while maintaining the angular relationship of the optical axes as described above.

In the vehicle headlamp 101 of the embodiment, the first reflector 122 and the second reflector 132 have a reflecting surface constituted by a substantially spheroidal surface, but may have a reflecting surface of other shapes. Further, the first projection lens 123 and the second projection lens 133 are plano-convex lenses having a front surface of a convex curved surface and a rear surface of a flat surface, but may be lenses having other shapes.

INDUSTRIAL APPLICABILITY

According to the present disclosure, a vehicle headlamp capable of securing a wide view in the horizontal direction at a distance without spoiling the appearance of the vehicle is provided.

What is claimed is:

1. A vehicle headlamp comprising:
    a first light source configured to form at least a high-beam light distribution pattern;
    a second light source configured to form an additional light distribution pattern that irradiates a distance that is equal to or farther than the high-beam light distribution pattern, and irradiate light with a luminous intensity higher than that of the first light source;
    a posture switch configured to switch between a first posture in which an optical axis of the second light source is parallel to an optical axis of the first light source and a second posture in which the optical axis of the second light source is deviated in a horizontal direction by a predetermined angle from the optical axis of the first light source; and
    a controller configured to control an ON/OFF state of the second light source and an operation state of the posture switch according to a vehicle speed acquired from a vehicle,
    wherein the controller controls such that
    when the vehicle speed is less than a first vehicle speed, the second light source is put in the first posture, and turned OFF,
    when the vehicle speed becomes the first vehicle speed while the second light source is put in the first posture and turned OFF, the posture switch is operated to switch a posture of the second light source to the second posture, and
    when the vehicle speed becomes a second vehicle speed higher than the first vehicle speed while the second light source is put in the second posture and turned OFF, the second light source is turned ON.

2. The vehicle headlamp according to claim 1, wherein a luminance of the second light source is higher than the luminance of the first light source.

3. The vehicle headlamp according to claim 1, wherein the controller operates the posture switch such that, when the vehicle speed becomes less than a third vehicle speed equal to or less than the first vehicle speed while the second light source is put in the second posture and turned ON, the second light source is turned OFF, and the posture switch is operated to switch the posture of the second light source to the first posture.

4. A vehicle headlamp comprising:
a first light source unit configured to form at least a high-beam light distribution pattern, and including a first light source and a first projection lens that emits light from the first light source to a front of a vehicle; and
a second light source unit configured to form an additional light distribution pattern that irradiates a distance that is equal to or farther than the high-beam light distribution pattern, and irradiate light with a luminous intensity higher than that of the first light source unit, and including a second light source, a reflector that reflects light from the second light source, and a second projection lens that emits the light reflected by the reflector to the front of the vehicle,
wherein an optical axis of the second projection lens is parallel to an optical axis of the first projection lens, and
an optical axis of the reflector is deviated in a left-right direction by a predetermined distance from the optical axis of the second projection lens.

5. The vehicle headlamp according to claim 4, wherein a luminance of a light source of the second light source unit is higher than that of a light source of the first light source unit.

6. The vehicle headlamp according to claim 4, wherein the optical axis of the reflector is parallel to the optical axis of the second projection lens.

* * * * *